United States Patent [19]

Dumais et al.

[11] Patent Number: 5,479,546
[45] Date of Patent: Dec. 26, 1995

[54] OPTIMIZED NON-LINEAR EFFECT TAPERED OPTICAL FIBER INTERFEROMETER/SWITCH DEVICE

[75] Inventors: Patrick Dumais, Outremont; Suzanne Lacroix, Verdun; Francois Gonthier, Montreal, all of Canada; Richard J. Black, Menlo Park, Calif.; Jacques Bures, Outremont, Canada

[73] Assignee: Litton Systems, Inc., Woodland Hills, Calif.

[21] Appl. No.: 245,172

[22] Filed: May 16, 1994

[51] Int. Cl.⁶ .............................. G02B 6/26; G01B 9/02
[52] U.S. Cl. ........................ 385/43; 385/16; 385/27; 385/28; 385/30; 356/345
[58] Field of Search ............... 385/1–3, 16, 27–30, 385/43; 372/6, 31, 69, 70; 356/345, 349

[56] References Cited

U.S. PATENT DOCUMENTS

| | | | |
|---|---|---|---|
| 3,995,937 | 12/1976 | Baues et al. | 385/14 |
| 4,087,159 | 5/1978 | Ulrich | 385/39 |
| 4,753,529 | 6/1988 | Layton | 356/345 |
| 4,789,240 | 12/1988 | Bush | 356/345 |
| 4,900,119 | 2/1990 | Hill et al. | 385/27 X |
| 4,946,250 | 8/1990 | Gonthier et al. | 350/96.29 |
| 5,093,569 | 3/1992 | Krumboltz et al. | 385/123 X |
| 5,119,453 | 6/1992 | Gonthier et al. | 385/43 |
| 5,177,803 | 1/1993 | Newhouse et al. | 385/43 |
| 5,294,694 | 3/1994 | Epstein et al. | 528/210 |
| 5,351,325 | 9/1994 | Miller et al. | 385/42 |

FOREIGN PATENT DOCUMENTS

| | | | |
|---|---|---|---|
| 1284282 | 9/1986 | Canada | 88/97.6 |

OTHER PUBLICATIONS

"Enhanced Self Phase Modulation in Tapered Fibers" P. Dumais, et al., Optics Letters, XVIII, No. 23 (Dec. 1, 1993), pp. 1996–1998.

"Loss Calculations for Antiresonant Waveguides" J. Archambault, R. Black, et.al. Journal of Lightwave Technology, XI, No. 3 (Mar., 1993) pp. 416–423.

"Modal Interference in All Fibre Sensor, Measured by Coherence Multiplexing Technique" H. R. Giovannini, F. Gonthier, et al.
Electronics Letters, XXIV, No. 1 (Jan. 7, 1993) pp. 29–31.

"Investigation of Power Oscillations Along Tapered Monomode Fibers" F. Gonthier, et.al., Applied Optics, XXVI, No. 3 (Feb. 1987) pp. 444–449.

"All–Fiber Wavelength Filter from Successive Biconical Tapers" S. LaCroix, F. gonthier, et. al. Optics Letters, XI, No. 10 (Oct., 1986) pp. 671–673.

*Primary Examiner*—Brian Healy
*Attorney, Agent, or Firm*—Chester E. Martine; James F. Kirk

[57] ABSTRACT

A tapered optical fiber component is provided that has an optical fiber with a cladded region. An optical core passes through the cladded region. The cladded region has a tapered extended first region drawn down in diameter to form an effective area region that has a predetermined effective area. The tapered extended first region is formed to adiabatically concentrate an optical signal for propagation through the effective area region of reduced diameter. The power density of the optical signal propagating through the effective area region is increased as an inverse function of the effective area.

15 Claims, 5 Drawing Sheets

OPTIMIZED NON-LINEAR EFFECT TAPERED OPTICAL FIBER INTERFEROMETER/SWITCH DEVICE

BACKGROUND OF THE INVENTION

1. Field of the Invention

This invention relates to the field of optical fiber and more particularly to optical fiber components including optical phase shifters, frequency doublers and non-linear or wave length dependent couplers that use or require the application of non-linear properties such as the Kerr Effect or Dispersion for operation.

2. Related Art

Some common inventors with this application, i.e., F. Gonthier, S. Lacroix and J. Bures provide a discussion of a "Wavelength-flattened 2×2 splitter for single-mode optical waveguide" in U.S. Pat. No. 5,119,453 issuing in 1992 along with coinventors D. Richard. Common inventors S. Lacroix, R. Black, F. Gonthier and J. Bures provide a discussion of a "Compact Wavelength filter integrated into a single mode optical fiber" in U.S Pat. No. 4,946,250 that issued in the U.S. in 1990 with co-inventor X. Daxhelet. Common inventors with this application S. Lacroix and F. Gonthier provide a discussion of "Spectral filter integrated in a single mode optical fiber" in Canadian patent 1,284,282 issued in 1990.

Common inventors F. Gonthier, S. Lacroix and J. Bures along co-authors with J. Lapierre and C. Ceilleux provide a discussion of an "Investigation of power oscillations along tapered monomode fibers" in a publication appearing in Applied Optics, Vol. 26, No. 3, February 1987 at page 444–449. This reference discusses how a tapered fiber can be visualized as three regions in which a central region between two tapered regions is quasi-cylindrical and in which beating occurs.

None of these references teach an optimized non-linear effect tapered optical fiber or the method of making the same.

SUMMARY OF THE INVENTION

The Invention relates to a tapered optical fiber component formed from an optical fiber a having a stripped region exposing the cladding. An optical core passes through the cladding. The stripped region has an extended first region having a tapered region drawn down to form an effective area region of reduced diameter having a predetermined diameter and a corresponding predetermined effective area. The extended first region is tapered down in diameter to adiabatically concentrate an optical signal for propagation through the effective area region of reduced diameter.

The power density of the optical signal propagating through the effective area region of reduced diameter is increased as an inverse function of the effective area. The smaller the effective area, the larger the increase in power density.

The tapered optical fiber component is formed from jacketed optical fiber, the jacket being removed to expose the cladded region in the tapered region.

In silica fiber, at 1 um (micrometer) diameter, the diameter of the effective area region or region of minimum diameter is sized to cutoff all except the LP01 and LP11 modes of optical signal passing through the fiber as it is being reduced in diameter.

It is a principal object of the invention to reduce the diameter of the effective area region to a predetermined diameter to obtain the optimal effective area for a predetermined optical signal having a predetermined wavelength.

DESCRIPTION OF THE PREFERRED EMBODIMENT

Figure 1:
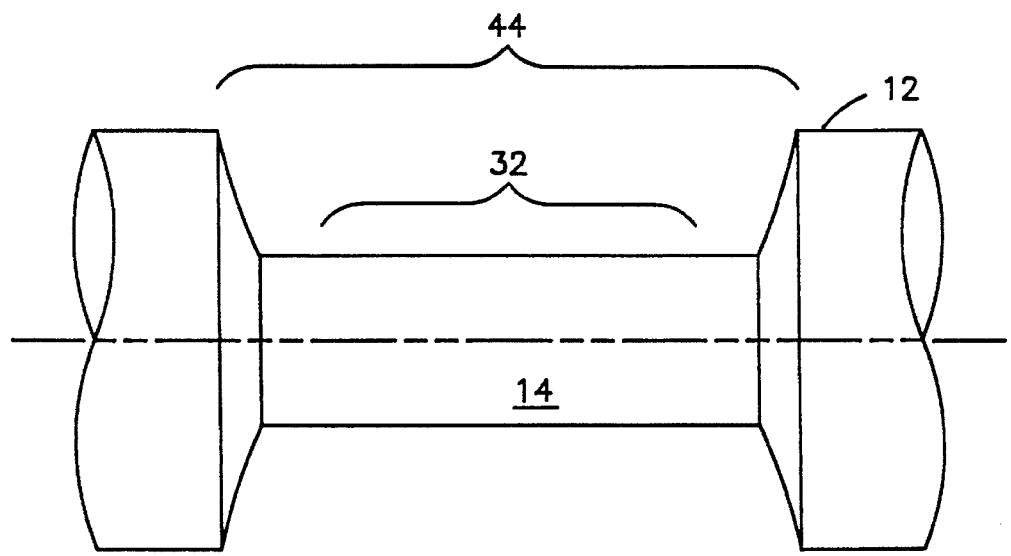
FIG. 1 is a schematic plan view of a segment of optical fiber with a portion of its jacket removed preparatory to the preliminary tapering step.

FIGS. 1–4 show a the steps in forming a tapered optical fiber component 10. An optical fiber 12 has a cladded region 14. In an alternative embodiment a core 16 is omitted. The cladded region has a transition region 18 to form an effective area region 20 shown in FIG. 3 that has a predetermined effective area 22. The effective area is determined from FIG. 6 from the diameter 24 the The transition region 18 is characterized to concentrate an optical signal 26 (FIG. 5) for propagation through the effective area region. The optical signal has an initial power density in an untapered 28 preceding the tapered region 30. The optical signal propagates to and through the effective area region 22, the power density thereof being increased relative to the initial power density in the untapered region 28. The increase in power density is an inverse function of the effective area.

Figure 2:
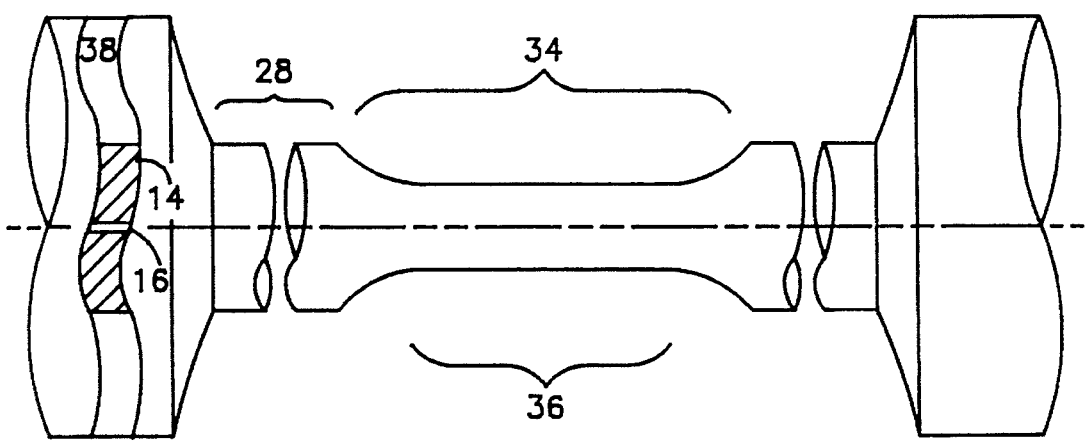
FIG. 2 is a schematic plan view of a length of optical fiber showing a broken away region and a preliminary tapered region of the cladded region.

FIG. 1 shows a length of optical fiber with the jacket removed to provide a first region 32 where the invention tapered optical fiber is to be formed. FIG. 2 shows the length of optical fiber of FIG. 1 after it has been heated with a broad flame and drawn to form an extended first region 34 having a substantially constant diameter region 36 of approximately 10 um. The broken away section in FIG. 2 shows the core 16, the cladded region 14 and the jacket 38 in section.

Figure 3:
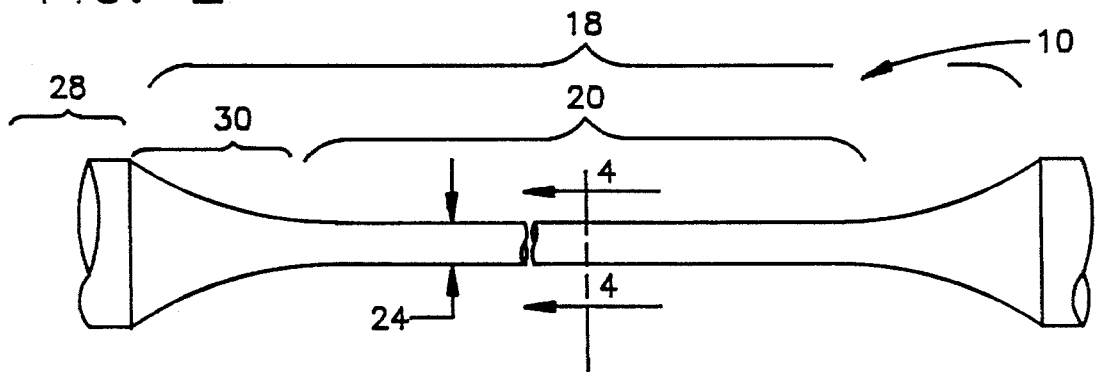
FIG. 3 is a schematic plan view of a length of optical fiber showing a the preliminary tapered region tapered using a narrow flame to form a region of optimum or minimum effective area.
Figure 4:
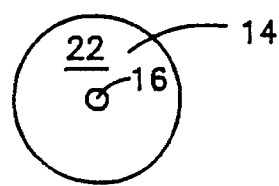
FIG. 4 is a sectional view of the region of optimum or minimum effective area of FIG. 3 taken on sectional lines 3—3.

The preferred embodiment of the invention tapered optical fiber component is illustrated schematically in FIGS. 3 as having an effective area region 20, while FIG. 4 provides a sectional view of the optical fiber component. The sectional view is exaggerated in size and it is taken on section line 4—4 of FIG. 3 within the effective area region of substantially constant diameter 20 to schematically illustrate the size of the core with respect to the cladding over the region of substantially constant minimum effective area.

Figure 5:
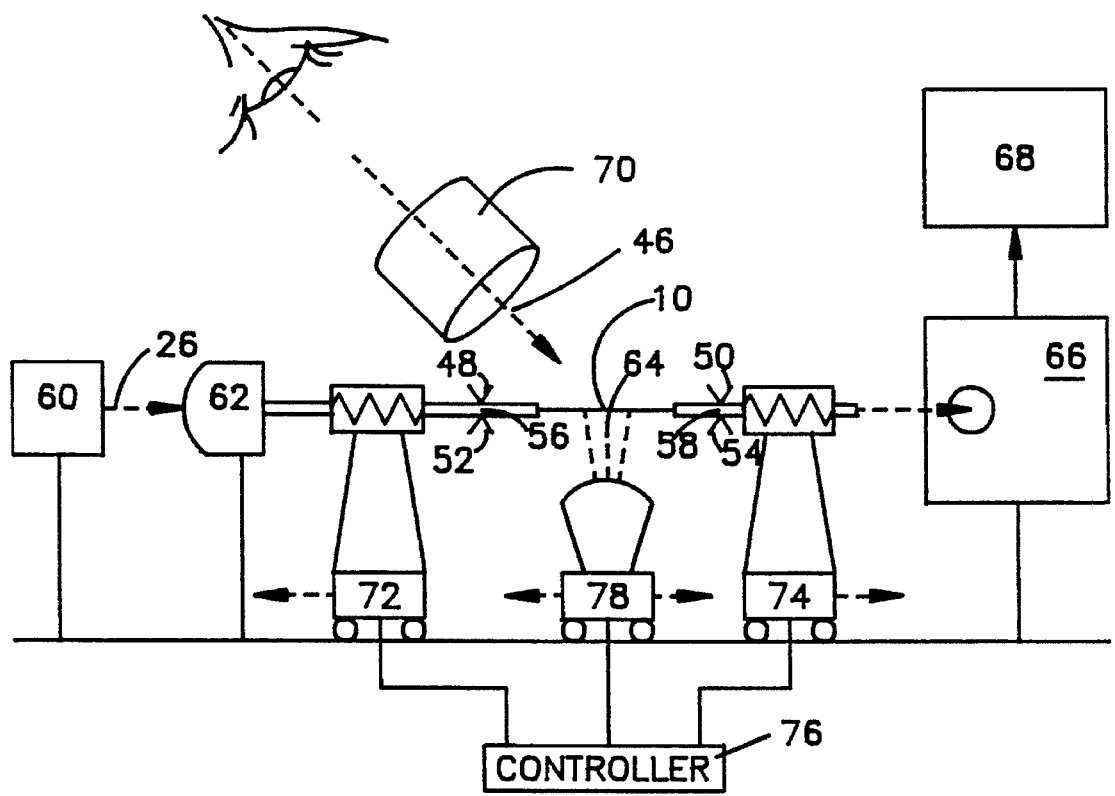
FIG. 5 is a schematic diagram of a bench setup for tapering the preliminary tapered region down to a minimum effective are.

FIG. 5 schematically shows a laboratory arrangement 42 of equipment for making the preferred embodiment of the invention tapered optical fiber component 10. Referring again to FIG. 1, a portion of the jacket material is removed from the cladding to expose a stripped region 44 of exposed cladding where the tapered optical fiber is to be formed.

FIG. 5 shows a length of optical fiber positioned into a tensioner 46. The tensioner engages the length of fiber on jacketed portions of the length of optical fiber. Two spring clamps 48, 50 are used to hold the fiber jacket against dowels 52, 54 to form pressure points 56, 58 to induce mode mixing.

An optical signal 26 is coupled from a laser source 60 into the fiber via lens 62. The first region is heated with a broad flame 64 to permit a length of the first region of exposed cladding to be drawn and extended to form an extended first region 34 having an extended first region length with a substantially constant first region diameter along the extended first region. The extended first region is formed to propagate light adiabatically or losslessly throughout its length.

FIG. 5 shows an optical signal from a laser source 60 such as a HeNe Source being coupled into the optical fiber. A power meter 66 is used to monitor the power of the optical signal into and leaving the optical fiber to insure that the extended first region 34 of the optical fiber continues to propagate light without loss or through the extended first region 34 by measuring the amount of optical power entering and leaving the length of optical fiber for detectable losses.

It should be understood that the wavelength of the laser source 26 should be shorter than the operation wavelength of the tapered fiber component as the tapered optical fiber component must be multimode for the fabrication wavelength in order to produce the signal with which to control the diameter in the tapering step. By way of example, in the present example, a HeNe laser is used in the fabrication steps with a wavelength of approximately 632.8 nm; however, the component was to be used with a signal source of 1550 nm. The fabrication process requires the excitation of a second mode so that a beat note can be obtained on the power meter 66 and recorder 68.

FIG. 5 also shows the use of an instrument, such as a microscope 70, for measuring the diameter of the extended first 34 region as the broad flame 64 is used to continuing the drawing process until a diameter of approximately 10 um is obtained for the extended first region.

The extended first region, as described, is a tapered or transitioned region that is formed to losslessly or adiabatically concentrate the optical signal from an optical signal source from the un-tapered cladding into an effective area region 20, formed by the method of making, to be a region of optimum or minimum effective area. The effective area region of optimum or minimum effective area substantially optimizes the optical power density of the optical signal propagating through the region of optimum or minimum effective area. In this manner, the Kerr Effect is increased by the increased power density to provide an increased phase shift to the optical signal propagating through the effective area region of optimum or minimum effective area 20.

The extended first region 34 of the optical fiber having a substantially constant diameter region 36 of approximately 10 um is then heated with a narrow flame while driving the tensioner at a predetermined draw rate to draw or tension the extended first region of the optical fiber or cladding down in diameter to obtain the effective area region 20 having the predetermined effective area 22 and a predetermined length predetermined effective area 22 and a predetermined length while monitoring the optical power out of the fiber with the power meter 66 for a predetermined beat note as a function of the draw rate and a beat length of the optical signal. A draw rate of 10 um/sec has been used with optical fiber of silica to form effective area regions having a diameter of approximately 1.0 um while monitoring a beat note of approximately one cycle per second. The tensioner is formed of first and second stepper motors 72, 74, each being controlled by controller 76. The burner 78 is positioned by burner stepper motor 78. The controller is typically a programmable industrial controller with a clock or precision time base reference.

Figure 6:
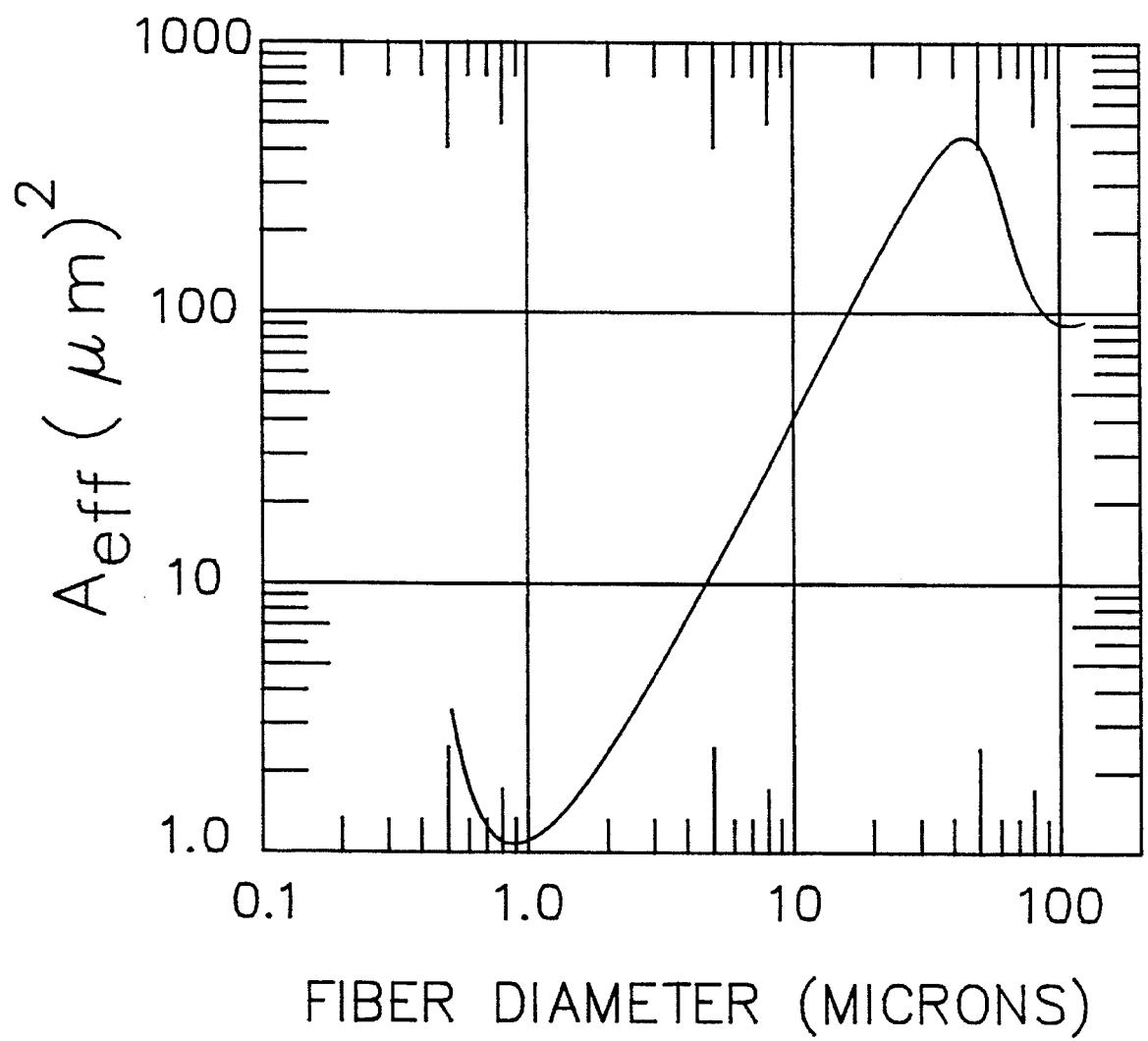
FIG. 6 is a graph of effective area as a function of cladding diameter.

FIG. 6 is an analytically derived curve that depicts the effective area of the fundamental mode of Corning SMF-28 optical fiber as a function of cladding diameter as for an optical signal having a lambda or wavelength of 1550 nm. The derivation of this curve is related to an equation for the change in propagation constant $\Delta\beta$, that is explained in an article published in Optics Letters/Vol 18, No. 23 on Dec. 1, 1993 at pages 1996, 1997 and 1998. A copy of this article is attached to this application as filed as appendix A.

Appendix B provides a two page method for calculating the propagation constant of a circular waveguide. The contents of Appendix B is incorporated herein by reference in its entirety.

FIG. 6 can be used with optical fiber, such as Corning SMF-28 to show that the effective area of the fiber initially increases as the diameter is initially reduced. Using the graph of FIG. 6, for the medium of Corning SMF-28, the user can predetermine what the effective area will be for the optical fiber for a predetermined diameter. As explained in the paper of Appendix A, the non-linear phase shift is $\Delta\beta$ times L where L is the propagation length of the effective area region and $\Delta\beta$ is the change in the propagation constant of the fundamental mode. It can be shown that $\Delta\beta$ is equal to:

$$\Delta\beta = kn_2/Aeff$$

where in silica is the nonlinear Kerr coefficient=($n_2$=2.7× $10^{-20}$ m$^2$/W); k=the wave number=(2× pi/lamda); P=the optical power and Aeff is obtained from FIG. 6 for Corning SMF-28 silica fiber having any predetermined tapered diameter.

Figure 10:
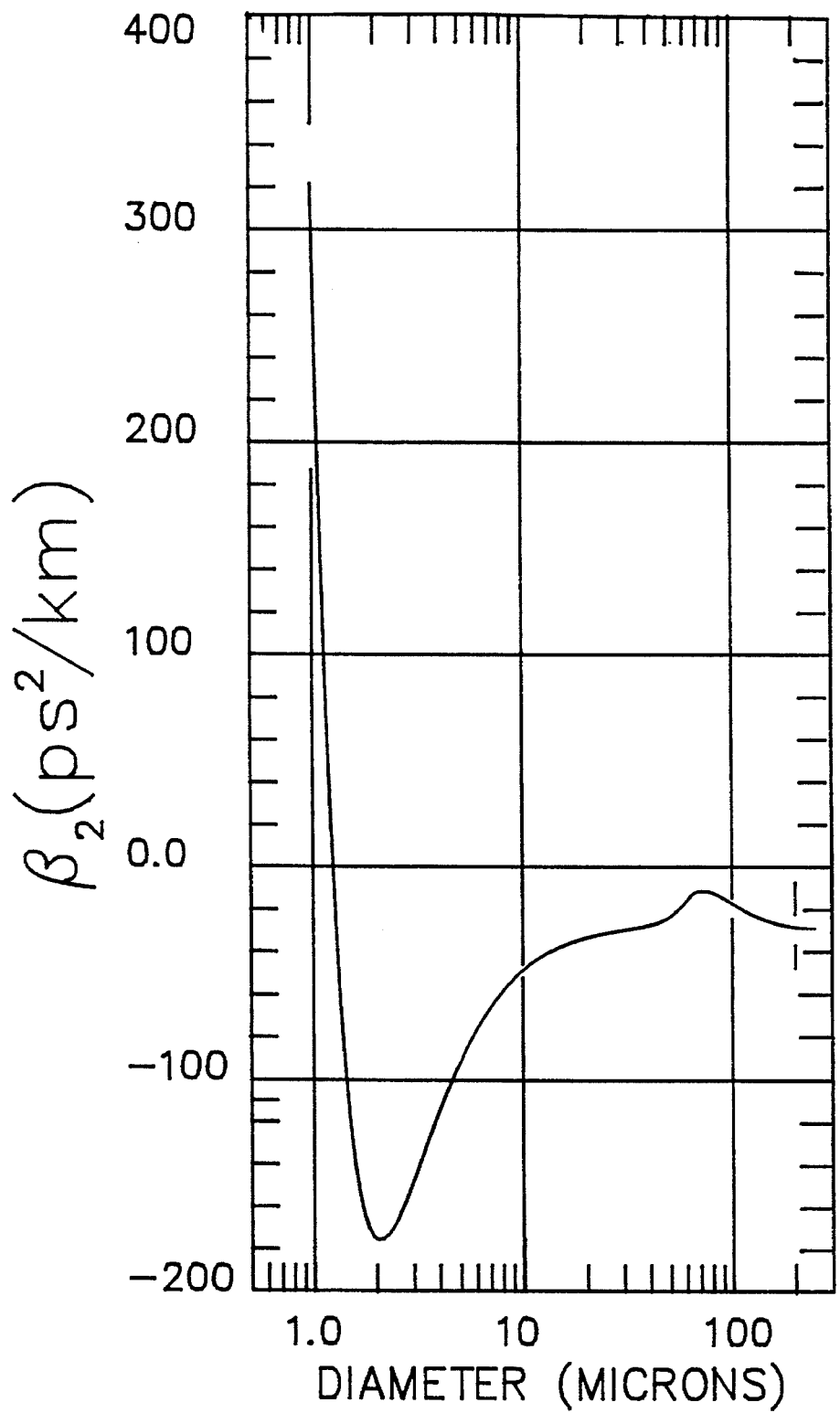
FIG. 10 is a graph of dispersion as a function of fiber diameter.

Tapering the tapered optical fiber to obtain a predetermined effective area also modifies the dispersion of the optical fiber or optical waveguide. It should be understood that optical fibers are a class of devices in a larger class of optical waveguides which in the future, might include waveguides in integrated optics tapered by lithographic or maskwork diffusion techniques or by chemical, laser or mechanical micromachining. FIG. 10 provides the values of dispersion for corresponding diameter values for a silica optical fiber of circular cross section. Referring to FIG. 10, note that for certain values of diameter, the dispersion is has a negative sign and for others the sign is positive. There is one value of diameter for which dispersion is zero. As the dispersion changes sign for diameters under 1.2 µm, a tapered section could be used to compensate the dispersion incurring in an associated untapered length of untapered optical fiber.

The $\Delta\beta$ relationship in combination with a predetermined diameter, such as a diameter of approximately 1.0 um, is selected to provide an optimum or minimum effective area and a known wave length permits the design of a tapered fiber optical component providing a predetermined additional phase shift in the optical signal leaving the tapered optical fiber component for a predetermined change in input power level.

After formation, the tapered optical fiber component fragile and it must be encased to operate. In an alternative embodiment, the jacketed ends of the optical fiber are bonded to a frame, such as a long thin glass rectangle cut from a specimen slide. The frame is positioned in a rigid container having at least one end. The first and second ends of the jacketed optical fiber extend from at least one end of said rigid container. The end(s) of the container are then sealed with epoxy.

Figure 7:
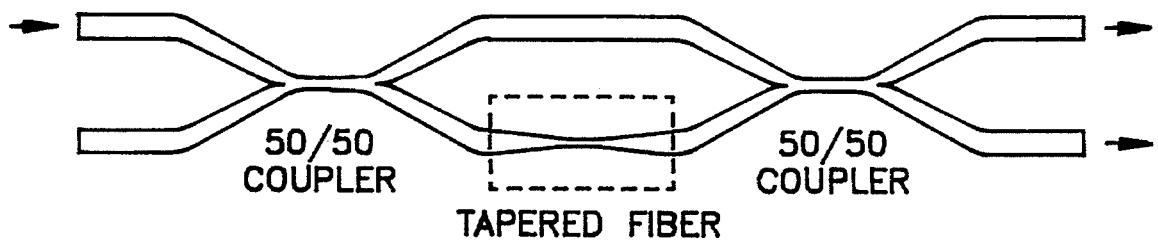
FIG. 7 is a schematic diagram of an optical switch using the invention tapered optical fiber component.
Figure 8:
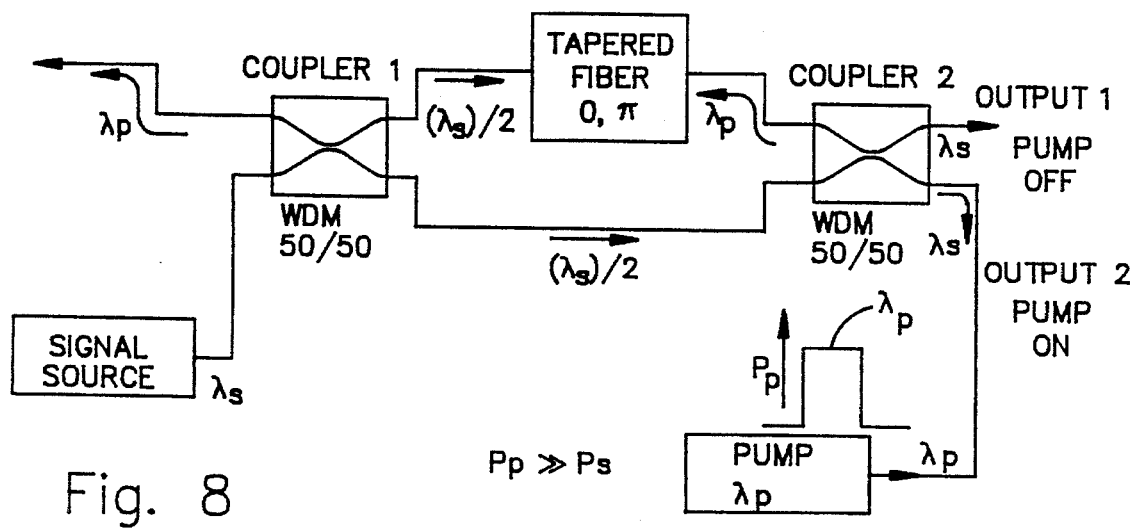
FIG. 8 is an alternative embodiment of an optical switch using the invention tapered optical fiber component.
Figure 9:
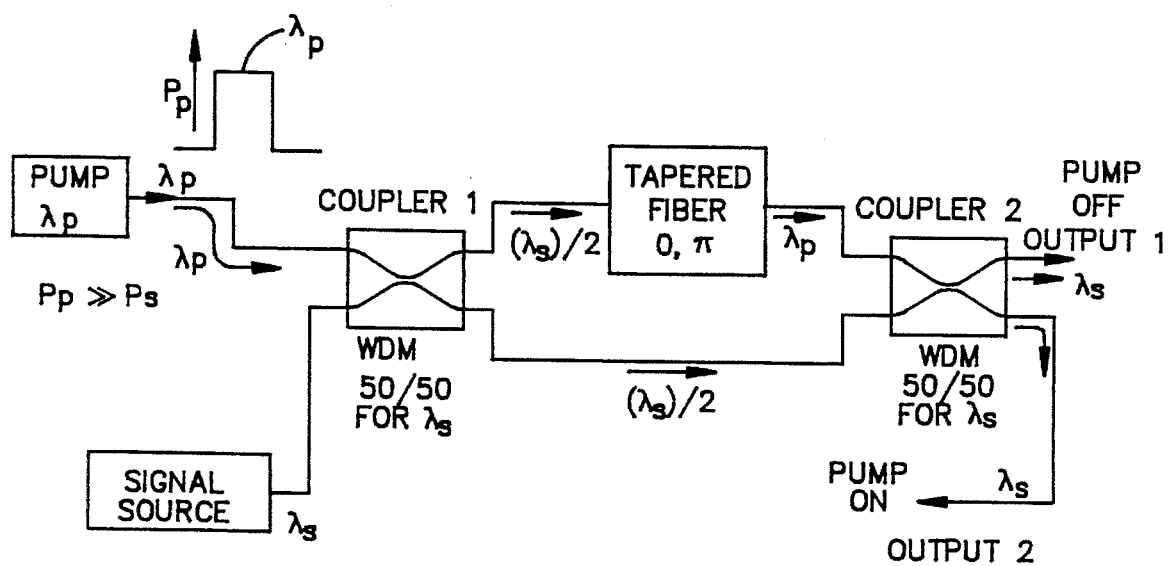
FIG. 9 is another alternative embodiment schematic diagram of an optical switch using the invention tapered optical fiber component.

FIGS. 7, 8 and 9 depict alternative optical switch topologies using all-fiber Mach-Zehnder Interferometers. The configuration of FIG. 7 is formed by preparing a pair of optical fibers with two stripped regions each. The stripped regions are then brought together before fusing the twisted pairs to form two tapered bi-conical couplers of approximately 1 um$^2$ for the fundamental mode at a wavelength of 1.55 um. One of the arms is then stripped and the apparatus of FIG. 5 is used to form a tapered optical fiber component in the arm. The outputs are switched by modulating the level of power of the input signal source at the left of FIG. 7.

FIG. 8 and FIG. 9 are more elaborate alternative embodiments of the optical switch of FIG. 7. In each case, it should be understood that the pump power is much greater that the signal power.

FIG. 8 shows a pump light source at the lower right represented by the block designated PUMP. The pump light source is shown providing a pulse modulated source of optical power with a wavelength of λp. The small graph inserted above the pump source schematically indicates that pump optical pulse has an optical power of $P_p$.

As shown in FIG. 8, the optical pulse is directed via an optical fiber to the lower right side of block designated as COUPLER 2. The COUPLER 2 block schematically represents a WDM (wavelength dependent multiplexer) having a transmission ratio of 50/50 at the signal wavelength λs. The COUPLER 2 is specified to transfer all of the pump power from its lower right port to its upper left port. The pump power is then coupled to the right side of the block containing the legend TAPERED FIBER which is understood to contain a tapered fiber prepared using the process equipment of FIG. 5.

A block designated by the legend SIGNAL SOURCE at the lower left of FIG. 8 represents an optical signal source. The signal source provides an optical signal that is to be optically switched. The optical power from the signal source has a wavelength of λs. The optical signal from the optical signal source is coupled via an optical fiber to the left WDM having a 50/50 power splitting ratio at a wavelength of λs. The left WDM is designated as COUPLER 1. The WDM of COUPLER 1 couples one half of the signal power, represented by (λs)/2 via an optical fiber to the left input of the TAPERED FIBER. The remainder of the optical signal power is coupled into the lower fiber arm of the interferometer.

In the absence of an optical pulse from the pump source, the TAPERED FIBER couples one half of the signal power, represented by (λs)/2, via an optical fiber, to the top left input of COUPLER 2 in which the signal power is recombined with the signal power, represented by (λs)/2, from the lower optical fiber arm. With the pump source off, the optical signals combine in COUPLER 2 and are output at the right at OUTPUT 1 as the PUMP OFF signal.

If the pump power is on in the optical switch of FIG. 8, the pump pulse causes the TAPERED FIBER to alter the phase of the signal power entering the TAPERED FIBER from the left causing it to experience a substantial phase shift as it exits the TAPERED FIBER at the right. The "0,π" legend in the block designated TAPERED FIBER, implies that with the concurrent arrival of pump power, a phase shift of up to π radians is possible. If the amplitude of the pump pulse power is of sufficient amplitude, the Kerr effect in the TAPERED FIBER will shift the phase of the signal source signal from the right side of the block designated TAPERED FIBER sufficient to cause optical cancellation of the signal source signal from the lower arm resulting in a blanked output at OUTPUT 1. The backward pump embodiment of FIG. 8 has the advantage that it produces an output at OUTPUT 1 in the absence of a pump power signal pulse that is not mixed with light from the pump.

The block designated COUPLER 1 is a WDM that splits the optical signal from the block designated SIGNAL SOURCE in a 50/50 ratio, delivering half of the signal source power to the tapered fiber in the block designated TAPERED FIBER and the remainder of the signal power to the lower left port of the WDM designated as COUPLER 2. The left WDM, COUPLER 2, is specified as shown, to deliver all of the pump power pulse to the left port of the tapered fiber. In the absence of an optical pump power pulse, the tapered fiber does not substantially shift the phase of the signal source power, represented by (λs)/2, as it passes through the tapered fiber and enters the top left port of the WDM designated as COUPLER 2. The signal source power is combined non-destructively in the COUPLER 2 WDM and coupled to one or both outputs depending on the characteristics of the WDM.

In the presence of a pulse of optical pump power from the block designated as PUMP, the tapered fiber will shift the phase of the signal source power passing through the tapered fiber due to the Kerr effect. The phase shift induced in the signal source signal, represented by (λs)/2, by the tapered fiber results in a near complete destructive interference within COUPLER 2 as the phase shifted signal source signal is recombined with the optical signal in the lower arm, represented by (λs)/2. The result is that very little optical signal source energy is delivered at the OUTPUT 1 or OUTPUT 2 ports. The COUPLER 2 WDM can be specified to pass the pump signal power from its top left port to its top right port or from its top left port to its lower right port depending on the design requirements.

Referring again to FIG. 7, the optical switch receives an input signal from an input signal source, at a first input . The all-fiber interferometer has its input signal port coupled to receive the input signal. A first output signal port for provides a first output signal. A pump signal input port is coupled to receive the pump signal, and a second output signal port is provided for a switched output signal in response to application of the pump signal.

The stripped fiber is then reduced in diameter to approximately 1.0 um. The output light is monitored on a power meter detector 66. A beat note is observed as a small narrow flame is applied locally to the 10 um region, the fiber being drawn in tension at a speed approaching 10 um/sec. The fiber is drawn flown to form a second reduced region of the having a target diameter in the 1.0 um range, as the beat note of whichever modes are present in the fiber being drawn is measured using a power meter measurement. The second reduced region of the target diameter is elongated to a predetermined length. Lengths in excess of 1.0 cm have been fabricated.

The interferometer of FIG. 7 also has a first and second signal arm for propagating equal portions of said input signal. A tapered optical fiber component is inserted into a series combination with one of said signal arms. The tapered optical fiber component introduces a phase shift in the portion of the input optical signal propagating through it in response to the presence of a portion of a pump signal. The phase shift is of sufficient amplitude to alter the state of said switched output signal.

The tapered optical fiber component in FIG. 3 has an optical fiber that has a cladded region with an optical core passing through the cladded region. The cladded region has a tapered extended first region drawn to form an effective area region of reduced diameter that has a predetermined effective area. The tapered extended first region is formed to adiabatically concentrate an optical signal for propagation through the effective area region of reduced diameter.

The power density of the optical signal propagating through the effective area region of reduced diameter is increased as an inverse function of the effective area. In this manner, the change in the index of refraction due to the Kerr Effect is controlled to provide a predetermined change in the velocity of the optical signal as it passes through the effective area region of reduced diameter resulting in a Kerr Effect, a dispersion effect or other non-linear induced phase shifted optical signal out of the component.

The tapered fiber optic component will provide the most phase shift for a change in pump power if the diameter of the effective area region is reduced to a the optimum or minimum effective area diameter (such as 1.0 um) for a predetermined optical signal having a predetermined wavelength. In each embodiment of the tapered optical fiber component, the a tapered extended first region is formed to losslessly or adiabatically concentrate an optical signal propagating through the region of predetermined effective area, and to substantially increase the optical power density of the optical signal passing through the region of predetermined effective area for a predetermined length.

An ordinary tapered silica optical fiber that is tapered to a diameter of approximately 1.0 um can be shown to provide an effective area of approximately 1 um$^2$. The effective area of 1 um$^2$ has been discovered to be the smallest effective area that can be obtained with the conventional ordinary telecommunications grade 125 um outside diameter silica fiber that is used.

The invention tapered optical fiber component method of making the Invention uses a 632.8 nm HeNe source to excite an optical fiber that has had its jacket removed chemically or mechanically. As stated above, the wavelength of the laser source to make the tapered optical fiber component is selected to be shorter than the wavelength of the signal source that the tapered optical fiber component will and the pump source light that will pass through it in any application.

Referring to the fabrication set-up of FIG. 5, a length of fiber is first positioned between a first and second clamp. The first and second clamps are coupled to respective first and second stepper motor arranged to extend or tension the fiber under the command of an industrial controller or computer in response to a program. The stepper motors are capable of being commanded to move along a common axis at micro-inch rates in either direction. The optical fiber has had a stripped region from which the jacket is removed, thereby exposing the cladding, before the optical fiber is positioned in the clamps.

In practice, the fiber is first reduced from a first transverse diameter in excess of 100 um to a first reduced region of approximately 10 um over a length sufficient to provide lossless or adiabatic operation as light passes through the first tapered or necked down region and out through a second necked down region. In this process a burner provides a flame that is adjusted in position and intensity to deliver heat to the first region.

A burner used to deliver the flame is mounted on a bunsen burner. The position of the flame is initially cycled at approximately a one cycle/per five sec rate back and forth along the longitudinal axis of the first region which might typically be eight mm in length. The process of drawing the fiber takes about 30 minutes during which period, the amplitude of the cyclic movement of the burner is constantly reduced so as to stationary at the end of this process of forming an extended first region having a diameter of approximately 10 um. The distance of the flame from the fiber, the intensity and the flame's orientation are adjusted as required.

Only the first two modes are not cut off as the fiber is reduced in diameter to approximately 1.0 um. The output light is monitored on a power meter detector. A beat note is observed and as a small narrow flame is applied locally to the 10 um diameter region as the fiber is drawn in tension at a speed approaching 10 um/sec. The fiber is drawn down to form a second reduced region of 1.0 um in diameter as the beat note of the first two modes is measured using a power meter measurement. The second reduced region of 1.0 um in diameter is elongated to a length determined by the application. Lengths in excess of 1.0 cm have been fabricated.

A diameter of 1.0 um of the final reduced region has been shown theoretically to provide the smallest possible effective area of about 1 um$^2$ for an ordinary telecommunications fiber with an initial cladding outside diameter of approximately 125 um. As the effective area in the necked down region is diminished, higher and higher optical power densities are realized within the necked down region for a fixed amount of input optical power to the fiber. The ratio between the original and optimized effective area, for 125 um fiber is approximately 80. By reducing the diameter of the fiber to a diameter that produces the smallest effective optical area, the component achieves the maximum optical power density possible in the necked down region for a fixed predetermined input optical power.

As shown above, the Kerr Effect is a week third order effect. The velocity with which optical power propagates through an optical fiber is a function of the index of refraction. The Kerr Effect provides that for increasing levels of optical power, the effective index of refraction for the optical fiber changes resulting in a change in the propagation velocity. A change in propagation velocity translates into a change in phase for an optical signal passing through the fiber, which change in phase is a function of change in input power.

Any change in input power results in a change in the power density within the necked down region that is approximated by multiplying the change in input power by a factor proportional to the reciprocal of the effective area. By way of example, for a 125 um fiber, a change of input power of 10 Mw would result in a change in the power density within the necked down region of 10 Mw*80=800 mW.

The advantages of this type of nonlinear element are:
  Low Losses
  Direct integrability to fiber networks
  Compactness Limits This technique is adaptable to any circular fiber having a single core and cladding, the core having the highest refractive index, or even a coreless fiber. It is however difficultly usable with fibers with a complex refractive index profile, or whose shape is not circular, such as polarization-preserving fibers or dispersion-shifted fibers. In case of doubt, it is possible to compute the effective area of a particular fiber in function of its diameter to find out if and how its nonlinear factor is optimizable.

There is an upper limit to the fabrication length of a tapered fiber, which is of a few centimeters. This present limit is imposed by the failure ratio and fabrication time that increase with the length of tapered fiber. This translates itself to the applications context to a lower limit to the optical operation power.

The tapered sections are much smaller in diameter than an untapered fiber. The tapered sections are naturally much more fragile. In addition, since in the tapered section the light is guided by the cladding (which is in direct contact with the exterior), the surface state must be protected, lest the taper becomes lossy due to surface diffusion. For these reasons, the tapered sections must be protected by a rigid and airtight packaging as described above.

Tapered fibers optimized for Kerr effect have been fabricated at the fiber optics lab (École Polytechnique, Montreal) and their nonlinear effect confirmed with experiments described in the paper of Appendix A. The fabrication requires some expertise but can be trusted to a technician. Packaged samples are available for demonstration.

Overview of the Fabrication Procedure for Tapered Fibers Step-by-Step Summary

Calculation of required beatlengths

Preparation of the fiber

Pre-Tapering

Tapering

Packaging

Fiber tapering is accomplished by heating the fiber while stretching it. In order to reach small diameters (less than 10 microns), this procedure is best done in two steps. In the first, the fiber is heated over a large area with a strong flame. In this step, no control of the diameter is necessary other than by visual inspection. This produces a gentle-sloped structure with an optimum or minimum diameter of approximately 10 microns over a centimeter of so. Next, a small flame is used locally on the pre-tapered section. In this step, control of the diameter is given by the signal transmitted through the fiber as it is being tapered. Since the length of the fiber increases as it is stretched, the phase condition between the various modes of the structure changes at the output, causing the signal to oscillate. Since the fiber is heated locally, the beating relates to the variation in length at a particular point, hence at a particular diameter. By computing beforehand the beatlengths as a function of the diameter, we can deduce the diameter from the observed signal, as we know the stretching speed and beating time. In order to obtain a tapered section of a given diameter over a desired length, once the target diameter is obtained, the flame is moved sideways to the adjoining area of larger diameter. This operation is repeated as necessary to obtain the desired length.

Detailed Step-by-Step Beatlengths

1. Calculation of Required Beatlengths

First, we need to compute the local propagation constants of all the modes present in the tapered structure of the target diameter. The beatlength between two modes is given by $$Z_b = 2\pi/\beta_1 - \beta_2$$

where $\beta_1$ and $\beta_2$ are the propagation constants. By way of example, for a 1.0 um diameter effective region, the beat length obtained would be approximately 10 um. If the stepper motors are drawing the fiber at 10 um/sec, a one cycle/sec oscillation would observed on the power meter. At a diameter of 1 micron and a wavelength of 632.8 nm in ordinary telecom fibers, only two modes are not cut off, so the only beating that can be observed is between these two modes. This simplifies considerably the signal analysis. The computation of the propagation constants can be done with a numerical method.

2. Preparation of the Fiber

Since most fibers are plastic coated for protection, it is necessary to remove this outer layer with a solvent or by a mechanical method. The bared section must be cleaned thoroughly as particles fused into the taper would decrease its transmission. The stripped area should be near to 6 centimeters in length. Next, the fiber must be secured on both ends, without slack, onto the stretching apparatus, ideally a pair of computer-controlled step motors on which are mounted some kind of fiber holders. Two pressure points must e placed on either side of the bared section. These points serve as perturbations that will cause mode mixing in the fiber.

3. Pre-tapering

In order for the taper to be adiabatic (meaning that the light propagating as the fundamental mode of the fiber will not be coupled with the other modes of the tapered structure while going through it), its slopes must be smooth enough to meet the adiabaticity criterion. For this reason and others, the tapering is begun with a large flame. The pressure points mentioned in the preceding paragraph overcome the adiabaticity for the fabrication duration, as otherwise there would be no signal with which to control the diameter.

An oxygen-propane microtorch (orifice size 0.029") with a 6 mm-long flame is used as a heat source. Essentially the flame must be near and hot enough to soften the (silica, in this case) fiber without deforming it.

As the diameter diminishes, the taper becomes more sensitive to the torch pressure so it may be necessary to move it away as the tapering occurs. Since we need to heat the fiber on a large area, we scan the fiber with the torch back and forth parallel to the fiber axis on an increasingly smaller area throughout the pre-tapering. The alternative would be to actually use a very large flame. We need to produce by this operation a point where the fiber has a diameter of about 10 microns, with smooth slopes in the transition areas.

The only control necessary during this operation is the monitoring of the mean transmitted power. It should be conserved through the pre-tapering if the slopes meet the adiabaticity criterion, and no defects are created. The exact diameter produced by the pre-tapering is of little consequence. It can therefore be monitored visually with a microscope. A smaller diameter facilitates the next fabrication step, but as the diameter decreases, the strong flame is more likely to cause a bending in the taper, or to blow it away altogether.

4. Tapering

The heat source in this step is given by a much smaller flame (from a torch head having a 0.011" orifice size). The torch used itself should be mounted on a step motor in order to be mobile in the three dimensions, firstly to be able to fine tune the distance of the heat spot from the taper, and secondly to move it on the axis parallel to the fiber.

A HeNe (or other) laser is coupled with a microscope lens into one end of the fiber. The other end is fed to a power meter. As mentioned earlier, the diameter is controlled by observing the beating of modes excited in the structure by the pressure points. At 632.8 nm wavelength, there are only two modes that can propagate in a fiber of 1 micron diameter. Therefore, near this diameter, the signal observed with the power meter as the fiber is stretched should be a simple sinus curve (polarization effects may modify the signal, depending on the excitation conditions). Knowing the beatlength as a function of diameter and the stretching speed yields the diameter of the fiber at the point where the flame is heating it.

The best way to obtain a long section of the desired diameter is to pull the fiber only from one side, leaving the torch stationary. The torch should be initially near the minimum-diameter region left by the pre tapering. Stretching speed should be neat 10 microns per second. Soon after the tapering is in progress, the flame is heating one of the slopes of the taper. Once the expected beating has been isolated from the signal, we can tell if the diameter at the torch point is either larger of lower than the target diameter. If it is larger, the torch must be moved (parallel to the fiber axis) closer to the smaller-diameter area, and further in the opposite case. The taper length should be accounted for once the desired beatlength has been reached. From this point, the beating should be maintained constant by adjusting the torch position in the way described above, until the target length is obtained. The taper length is given by the stretching distance done at the target diameter, plus the torch position offset. In general, the stretching length is much more significant than the torch offset.

5. Packaging

Once the taper is made, it must be packaged on order to protect if from stress, dust and humidity. Out technique is to glue the extremities onto a glass slab (custom cut from microscope slides) with ultraviolet-polymerizable glue and to encase this in a glass tube sealed with epoxy glue.

The effective refractive index of the silica medium in the second reduced diameter region is perturbed by a coefficient proportional to the optical Kerr coefficient of the medium times the squared magnitude of the electric field amplitude. As the effective refractive index of the material is altered, as a function of increased power density in the second reduced diameter region, the velocity of propagation of the wave is changed. A change in wave velocity through the second reduced diameter region that results from the increased power density translates into a phase shift between the wave entering the component and the wave leaving the component.

Although the invention has been disclosed and illustrated in detail, it is to be understood that the same is by way of illustration as an example only and is not to be taken by way of limitation. The spirit and scope of this invention is to be limited only by the scope of the claims.

What is claimed is:

1. An optical switch responsive to an input signal from an input signal source, said optical switch comprising:
   an interferometer having
   an input signal port coupled to receive said input signal,
   a first output signal port for providing a first output signal,
   a pump signal input port coupled to receive a pump signal having a first or a second amplitude, and
   a second output signal port for providing a switched output signal;
   a first coupler for coupling a first portion of the input signal from the input signal port to
   a first signal arm to provide a first arm output signal, and a second portion of the input signal to
   a second signal arm;
   the first coupler coupling a portion of the pump signal from the pump signal port to the first and second signal arms;
   a tapered optical fiber component being inserted in a series combination with one of said signal arms, said tapered optical fiber component introducing a phase shift in said portion of said input optical signal passing through it in response to the presence of a portion of a pump signal, to provide a second arm output signal;
   a second coupler for combining the first and second arm output signals, and for outputting the combined arm output signals as the first output signal to the first output signal port in response to a pump signal of a first amplitude and for outputting the combined arm output signal as the switched output signal to the second output signal port in response to a pump signal of a second amplitude.

2. The optical switch of claim 1 wherein said tapered optical fiber component further comprises:
   an optical fiber a having a cladded region with an optical core passing through the cladded region, the cladded region having a tapered extended first region drawn to form an effective area region of reduced diameter having a predetermined effective area;
   the tapered extended first region being formed to adiabatically concentrate an optical signal for propagation through the effective area region of reduced diameter, the power density of the optical signal propagating through the effective area region of reduced diameter being increased as an inverse function of the effective area;
   whereby, the change in the index of refraction due to the Kerr Effect is controlled to provide a predetermined change in the velocity of the optical signal as it passes through the effective area region of reduced diameter resulting in a Kerr Effect induced phase shifted optical signal out of the component.

3. The optical switch of claim 1 wherein said interferometer is a Mach-Zehnder interferometer.

4. The optical switch of claim 2 wherein the tapered optical fiber component of claim 2 is formed to have the diameter of the effective area region reduced to the minimum effective area for a predetermined optical signal having a predetermined wavelength.

5. The optical switch of claim 2 wherein the tapered optical fiber component is formed to have the diameter of the effective area region reduced to approximately 1.0 um.

6. An optical switch responsive to an input signal from an input signal source, said optical switch comprising:
   an interferometer having an input signal port coupled to receive said input signal, a first output signal port for providing a first output signal, a pump signal input port coupled to receive a pump signal, and a second output signal port for providing a switched output signal in response to application of the pump signal, said interferometer also having a first and second signal arm for propagating portions of said input signal,
   a tapered optical fiber component being inserted in a series combination with one of said signal arms, said tapered optical fiber component introducing a phase shift in said portion of said input optical signal passing through it in response to the presence of a portion of a pump signal, said phase shift being of sufficient amplitude to alter the state of said switched output signal, the tapered optical fiber having a cladded region, the cladded region having a transition region to form an effective area region having a predetermined effective area;

the transition region being characterized to concentrate an optical signal for propagation through the effective area region, the optical signal having an initial power density in the cladded region, the optical signal propagating through the effective area region having the power density thereof increased relative to the initial power density, the increase being as an inverse function of the effective area.

7. The optical switch of claim 6 wherein the interferometer is an all fiber interferometer and wherein the first and second signal arms propagate substantially equal portions of said input signal.

8. The optical switch of claim 6 wherein the interferometer is an all fiber interferometer.

9. The optical switch of claim 6 wherein the interferometer is an all fiber interferometer having a first and second bi-conical coupler, each respective bi-conical coupler having a pair of input ports and a pair of output ports, the first and second signal arms coupling the output ports of the first bi-conical coupler to the input ports of the second bi-conical coupler, a first input port on the first coupler being responsive to the input signal, and a first output port on the second bi-conical coupler providing the switched output signal in response to the pump signal being applied to the second input port of the first bi-conical coupler.

10. The optical switch of claim 9 wherein the a first output port on the second bi-conical coupler provides the switched output signal in response to the pump signal being applied to the second input port of the second bi-conical coupler.

11. The optical switch of claim 9 wherein the tapered optical fiber component is formed to have the diameter of the effective area region reduced to approximately 1.0 um.

12. The optical switch of claim 6 wherein at least one of the bi-conical couplers is formed to have its effective area reduced to approximately 1.0 um.

13. An all fiber optical switch responsive to an input signal from an input signal source, said optical switch comprising:

an all fiber interferometer having a first and a second bi-conical coupler, each respective bi-conical coupler having a pair of input ports and a pair of output ports, a first and a second signal arm coupling the output ports of the first bi-conical coupler to the input ports of the second bi-conical coupler, a first input port on the first coupler being responsive to the input signal, and a first output port on the second bi-conical coupler providing the switched output signal in response to the pump signal being applied to the second input port of the first bi-conical coupler;

a tapered optical fiber component being inserted in a series combination with one of said signal arms, said tapered optical fiber component introducing a phase shift in said portion of said input optical signal passing through it in response to the presence of a portion of a pump signal, said phase shift being of sufficient amplitude to alter the state of said switched output signal, the tapered optical fiber having a cladded region, the cladded region having a transition region to form an effective area region having a predetermined effective area;

the transition region being characterized to concentrate an optical signal for propagation through the effective area region, the optical signal having an initial power density in the cladded region , the optical signal propagating through the effective area region having the power density thereof increased relative to the initial power density, the increase being as an inverse function of the effective area.

14. The optical switch of claim 13 wherein the tapered optical fiber component is formed to have the diameter of the effective area region reduced to approximately 1.0 um.

15. The optical switch of claim 13 wherein at least one of the bi-conical couplers is formed to have its effective area reduced to approximately 1.0 um.

* * * * *

UNITED STATES PATENT AND TRADEMARK OFFICE
CERTIFICATE OF CORRECTION

PATENT NO. : 5,479,546

DATED : 12/26/1995

INVENTOR(S) : Dumais, Lacroix, Gonthier, Black and Bures

Page 1 of 6

It is certified that error appears in the above-identified patent and that said Letters Patent is hereby corrected as shown below:

On the cover page, at [56], right column under "OTHER PUBLICATIONS"

At lines 4 - 6:
        Delete lines 4-6 beginning with "Loss Calculations for ... 416-423." in their entirety.
    At line 15:
        Change the line that reads " Tapers" S. LaCroix, F. gonthier, et. al. Optics Letters, XI," to be --- Tapers" S. Lacroix, F. Gonthier, et. al. Optics Letters, XI, ---

Column 1
line 11
    Remove "frequency doublers"
line 19
    Change "issuing" to "issued"
line 20
    Change "Richard" to "Ricard"
line 29
    Change "Ceilleux" to "Veilleux"

Column 2
line 14:
    Change "showing a the preliminary" to "showing the preliminary "
line 19
    Change "3—3" to "4—4 "
line 38:
    Change "show a the steps" to "showing the steps "
line 44:
    Change "diameter 24 the" to "diameter 24."
line 48:
    Change "untapered 28" to "untapered region 28."

UNITED STATES PATENT AND TRADEMARK OFFICE
CERTIFICATE OF CORRECTION

PATENT NO. : 5,479,546
DATED : 12/26/1995
INVENTOR(S) : Dumais, Lacroix, Gonthier, Black and Bures It is certified that error appears in the above-identified patent and that said Letters Patent is hereby corrected as shown below:

Column 3
line 11
   Change "tensioner 46" to "tensioner 72 ,74 "
line 29
   Remove "or"

Column 4
line 2
   Remove line 2. It is a copy of line 1.
line 21, 22
   Delete the sentence "A copy ... filed as appendix A"
line 24-27
   Delete the paragraph
line 39
   Change "$\Delta\beta = k\, n_2/A_{eff}$" to "$\Delta\beta = k\, n_2 P/A_{eff}$"
line 55
   Change "the dispersion is has" to "the dispersion has"
line 65
   Change "wave length " to "wavelength"

Column 5
line 4
   Change "fragile" to "is fragile"
line 8 to 10
   Delete "having at least one end. The first and second ends of the jacketed optical fiber extend from at least one end of said rigid container"
line 10
   Replace "end(s)" by "ends"
line 15
   Delete "the twisted pairs"
- line 16 and 17

UNITED STATES PATENT AND TRADEMARK OFFICE
CERTIFICATE OF CORRECTION

PATENT NO. : 5,479,546
DATED : 12/26/1995
INVENTOR(S) : Dumais, Lacroix, Gonthier, Black & Bures It is certified that error appears in the above-identified patent and that said Letters Patent is hereby corrected as shown below:

Delete "of approximately 1 $\mu m^2$ for the fundamental mode at a wavelength of 1.55 $\mu m$"

Column 6
line 18
    Change "left" for "right"
line 19
    Change "left" for "right"
line 45
    Delete "for"
line 55
    Remove "of the" (Sentence should read : "... a second reduced region having a target diameter ...")

Column 7
line 27
    - Change " the a tapered" to " the tapered"
line 40-41
    Beginning of paragraph should read: "The method of making the Invention tapered optical fiber component uses ..."
line 46
    Change "that the tapered optical fiber component will and " to "that will pass through the tapered optical fiber component and"
line 50
    Change "between a first and second clamp" to "between the first and second clamps"
line 65
    Change "necked down" to "necked up"

UNITED STATES PATENT AND TRADEMARK OFFICE
CERTIFICATE OF CORRECTION

PATENT NO. : 5,479,546
DATED : 12/26/1995
INVENTOR(S) : Dumais, Lacroix, Gonthier, Black and Bures It is certified that error appears in the above-identified patent and that said Letters Patent is hereby corrected as shown below:

Column 8
line 1
   Change in first sentence: "a bunsen burner" to "motorized translation stages"
line 8
   Change "so as to stationary" to "so as to be stationary"
line 37
   Delete "As shown above", change "the" to --The--.
   Change "week" to "weak"
line 50
   Change "reciprocal" to "inverse"
line 51 and 53
   Change ", for a 125 μm fiber, a change of input power of 10 Mw would result in a change in the power density within the necked down region of 10 Mw * 80 = 800 mW" to "10 mW of optical power in a 1 μm diameter tapered fiber would result in the same non-linear phase change that would be produced by 80 x 10 = 800 mW of power in the same length of the standard 125 μm fiber."

Column 9
line 14-15
   Change "lest the taper becomes lossy" to "lest the taper become lossy"
line 24
   Delete "Packaged samples are available for demonstration."
line 67
   Formula should be written:

$$Z_b = 2\pi / (\beta_1 - \beta_2)$$

Column 10
line 3
   add after "10 μm" "at a wavelength of 632.8 nm"
line 23
   replace " e " by " be "

UNITED STATES PATENT AND TRADEMARK OFFICE
CERTIFICATE OF CORRECTION

PATENT NO. : 5,479,546
DATED : 12/26/1995
INVENTOR(S) : Dumais, Lacroix, Gonthier, Black & Bures It is certified that error appears in the above-identified patent and that said Letters Patent is hereby corrected as shown below:

Column 11
line 18
  Replace "neat" by "near"
line 22
  Replace "larger of lower" by "larger or smaller"
line 36
  Change "on order" to "in order"
line 37
  Change "protect if" by "protect it"
  Change "Out" to " One"

Column 13
line 33
  Change "the a first" to "the first"
line 39
  Change "µm" to "µm$^2$"
line 42
  Change "µm" to "µm$^2$"

UNITED STATES PATENT AND TRADEMARK OFFICE
CERTIFICATE OF CORRECTION

PATENT NO. : 5,479,546
DATED : 12/26/1995
INVENTOR(S) : Dumais, Lacroix, Gonthier, Black & Bures It is certified that error appears in the above-identified patent and that said Letters Patent is hereby corrected as shown below:

Column 14
line 37
   Change "µm" to "µm$^2$"
line 40
   Change "µm" to "µm$^2$"

Signed and Sealed this

Thirtieth Day of June, 1998

Attest:

BRUCE LEHMAN

*Attesting Officer*           *Commissioner of Patents and Trademarks*